US009697921B2

United States Patent
Hill

(10) Patent No.: US 9,697,921 B2
(45) Date of Patent: Jul. 4, 2017

(54) VENTILATION SYSTEM OPERATING METHOD FOR USE DURING A SERIOUS INCIDENT IN A NUCLEAR PLANT

(71) Applicant: AREVA GMBH, Erlangen (DE)

(72) Inventor: Axel Hill, Stockstadt (DE)

(73) Assignee: Areva GmbH, Erlangen (DE)

( * ) Notice: Subject to any disclaimer, the term of this patent is extended or adjusted under 35 U.S.C. 154(b) by 0 days.

(21) Appl. No.: 15/000,195

(22) Filed: Jan. 19, 2016

(65) Prior Publication Data

US 2016/0133347 A1 May 12, 2016

Related U.S. Application Data

(63) Continuation of application No. PCT/EP2014/058721, filed on Apr. 29, 2014.

(30) Foreign Application Priority Data

Jul. 19, 2013 (DE) ........................ 10 2013 214 230

(51) Int. Cl.
*B01D 53/04* (2006.01)
*G21F 9/02* (2006.01)
(Continued)

(52) U.S. Cl.
CPC ........... *G21F 9/02* (2013.01); *B01D 53/0446* (2013.01); *G21D 3/06* (2013.01); *G21F 7/015* (2013.01);
(Continued)

(58) Field of Classification Search
CPC .. B01D 5/047; B01D 5/0446; B01D 2257/11; B01D 2259/4508; G21D 3/06; G21F 7/015; G21F 9/02; Y02E 30/40
(Continued)

(56) References Cited

U.S. PATENT DOCUMENTS 3,769,505 A 10/1973 Lee et al.
3,890,121 A 6/1975 Thomas
(Continued)

FOREIGN PATENT DOCUMENTS

CN 1195419 A 10/1998
CN 201655347 U 11/2010
(Continued)

*Primary Examiner* — Frank Lawrence
(74) *Attorney, Agent, or Firm* — Laurence A. Greenberg; Werner H. Stemer; Ralph E. Locher

(57) ABSTRACT

A ventilation system operating method for a service personnel-accessible operations room or control room in a nuclear plant or nuclear power plant enables a supply of decontaminated fresh air at least for a few hours in the event of serious incidents involving the release of radioactive activity. The content of radioactive inert gases in the fresh air supplied to the operations room should be as low as possible. Therefore, an air supply line is guided from an external inlet to the operations room, a first fan and a first inert gas adsorber column are connected into the air supply line, an air discharge line is guided from the operations room to an external outlet, a second fan and a second inert gas adsorber column are connected into the air discharge line, and a switchover device interchanges the roles of the first and second inert gas adsorber columns.

1 Claim, 1 Drawing Sheet

(51) Int. Cl.
*G21D 3/06* (2006.01)
*G21F 7/015* (2006.01)

(52) U.S. Cl.
CPC .. *B01D 2257/11* (2013.01); *B01D 2259/4508* (2013.01); *Y02E 30/40* (2013.01)

(58) Field of Classification Search
USPC ............................. 95/95–98, 104, 127, 148
See application file for complete search history.

(56) References Cited

U.S. PATENT DOCUMENTS

| | | | | |
|---|---|---|---|---|
| 3,963,460 A | * | 6/1976 | Stumpf | B01D 53/04 376/314 |
| 4,038,060 A | * | 7/1977 | Kamiya | F25J 3/028 376/312 |
| 4,283,367 A | * | 8/1981 | Koeppe | C01B 23/00 422/159 |
| 4,314,828 A | * | 2/1982 | Saito | B01D 53/04 376/314 |
| 4,369,048 A | * | 1/1983 | Pence | B01D 53/0473 376/314 |
| 4,400,183 A | * | 8/1983 | Henrich | B01D 53/14 376/314 |
| 4,816,041 A | | 3/1989 | Ringel et al. | |
| 4,881,958 A | | 11/1989 | Eckardt et al. | |
| 5,872,825 A | | 2/1999 | Eckardt | |

FOREIGN PATENT DOCUMENTS

| | | |
|---|---|---|
| DE | 2312303 C2 | 3/1984 |
| DE | 3418972 A1 | 11/1985 |
| DE | 19650266 A1 | 6/1998 |
| EP | 0307581 A1 | 3/1989 |
| WO | 2006097217 A1 | 9/2006 |

* cited by examiner

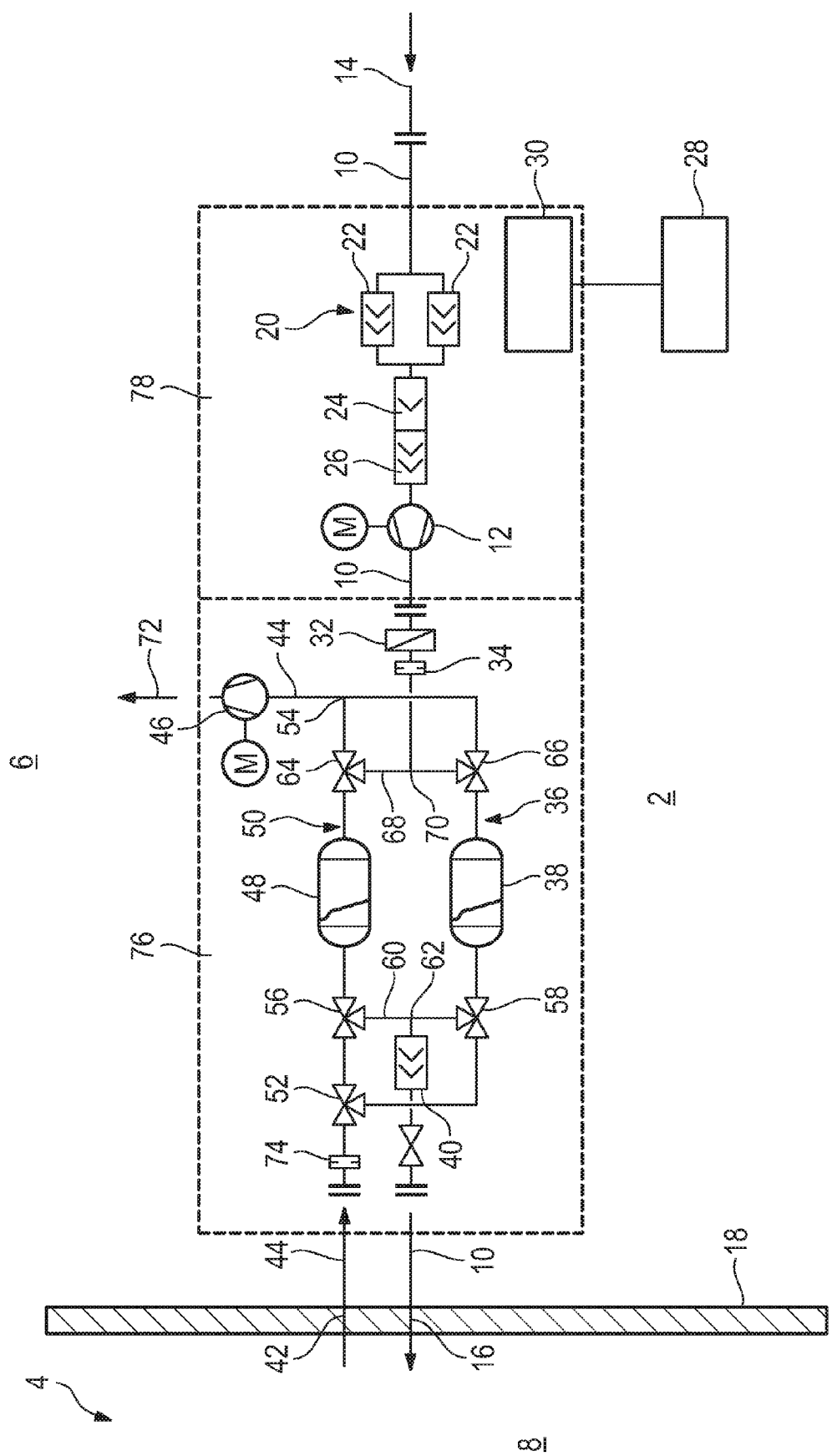

VENTILATION SYSTEM OPERATING METHOD FOR USE DURING A SERIOUS INCIDENT IN A NUCLEAR PLANT

CROSS-REFERENCE TO RELATED APPLICATION

This is a continuation, under 35 U.S.C. §120, of copending International Application PCT/EP2014/058721, filed Apr. 29, 2014, which designated the United States; this application also claims the priority, under 35 U.S.C. §119, of German Application DE 10 2013 214 230.7, filed Jul. 19, 2013; the prior applications are herewith incorporated by reference in their entirety.

BACKGROUND OF THE INVENTION

Field of the Invention

In a nuclear power station, in the event of situations involving incidents or accidents, a possibly significant release of radioactive fission products, in particular iodine, aerosols and noble gases, must be anticipated in accordance with the incident and any counter-measures initiated. As a result of leakages of the containment, in this instance there must also be assumed a release and distribution of activity in the power station buildings (for example, auxiliary plant building, switching installation, control room, etc.) before a release into the power station environment is brought about. In this instance, in particular the release of noble gases is a problem for the power station operators in addition to the release of activity connected with aerosols.

Under some circumstances, there is also produced a massive release of noble gases during the introduction of a filtered pressure release and the formation of a noble gas cloud above the power station site. Depending on the weather conditions, longer-term pollution cannot be completely excluded.

In order to introduce so-called accident management measures, it is absolutely necessary for the conditions in the control area, which is also referred to as a control room or management location, to allow the operators to remain without an inadmissible radiation exposure and contamination of the operators being produced.

In the event of configuration-exceeding incidents with "Station Black-Out" (SBO), the ventilation systems and filter systems operating normally and in accordance with provisions are no longer available in order to ensure the significant technical ventilation parameters to maintain the accessibility of the control room.

Previous concepts make provision for the control room to be isolated in order to control such scenarios. The supply is brought about, for example, with mobile ventilation systems which are provided with different filters. A satisfactory retention of noble gases is not possible with those systems.

Other concepts supply the control room with stored compressed air. However, the storage in pressurized containers for a longer time is very complex and is therefore limited. A modular and mobile system construction is not practically possible. Furthermore, pressure storage concepts require a high level of complexity in the case of retrofitting in operational plants.

SUMMARY OF THE INVENTION

It is accordingly an object of the invention to provide a ventilation system and an associated operating method for use during a serious incident in a nuclear plant, which overcome the hereinafore-mentioned disadvantages of the heretofore-known systems and methods of this general type and in which the ventilation system is kept as small and compact as possible for a control room or operation center of a nuclear plant or a similar room which is accessible to operators and in which the ventilation system allows a supply of decontaminated fresh air at least for a time of a few hours in the event of serious incidents with the release of radioactive activity so that there is produced the smallest possible radioactive exposure of operators who are present in the control room. In this instance, the proportion of radioactive noble gases in the fresh air supplied to the control room is particularly intended to be as small as possible. The ventilation system is further intended to have as passive a character as possible and to consume only a small amount of electrical energy.

With the foregoing and other objects in view there is provided, in accordance with the invention, a ventilation system for an operator-accessible operations room in a nuclear plant, in particular a control room in a nuclear power station. The ventilation system comprises an external inlet, an air supply line guided from the external inlet to the operations room, a first fan connected to the air supply line and a first noble gas adsorber column connected to the air supply line. There is also provided an external outlet, an air discharge line guided from the operations room to the external outlet, a second fan connected to the air discharge line and a second noble gas adsorber column connected to the air discharge line. A switch-over device exchanges functions of the first and second noble gas adsorber columns.

With the objects of the invention in view, there is also provided a method for operating a ventilation system for an operator-accessible operations room in a nuclear plant, in particular a control room in a nuclear power station. The method comprises guiding supply air through one of the noble gas adsorber columns thereby charging the one noble gas adsorber column with radioactive noble gases while simultaneously guiding discharge air through the other of the noble gas adsorber columns and thereby backwashing the other noble gas adsorber column.

Advantageous embodiments are set out below and will be further appreciated from the following detailed description.

The ventilation system according to the invention advantageously has inter alia an aerosol and iodine filtering module. In this instance, the intake air in the air supply line is drawn in through a fan and guided through high-efficiency particulate air filters in order to separate the aerosols. After the separation of the airborne particulates, radioactive iodine compounds are advantageously separated in an activated carbon filter bed. Impregnated activated carbon can be used in order to separate the radioactive methyl iodide by using isotope exchange or salt formation. A particulate filter is advantageously connected downstream of the activated carbon bed in order to retain dust particles.

The air which is filtered in this manner is then supplied to a noble gas module in a second process step. The noble gas module substantially contains two adsorber columns in a twin configuration which are filled with adsorbent(s), preferably activated carbon. The adsorbent of the columns may also be constructed from a plurality of layers of activated carbon and/or zeolite and/or molecular sieves.

The air supply is introduced into the first adsorber column, wherein the noble gases such as, for example, xenon, krypton, are decelerated by a dynamic adsorption during the passage thereof through the column. After the column, a filter is advantageously disposed to retain adsorber particulates.

The discharge air from the room region to be supplied is simultaneously guided through the second adsorber column and brings about at that location a backwashing of the previously accumulated noble gas activity so that this column is again ready for charging after the change-over. The change-over is carried out at the latest shortly before the cessation of the activity in the first adsorber column, wherein it is then backwashed with the discharge air. The change-over is preferably triggered passively by a timing member or an activity measurement unit.

The backwashing is advantageously supported by a fan in the air discharge line, wherein the volume increase of the discharge air flow as a result of the reduced pressure increases the backwashing process of the noble gases.

There is advantageously located in the air discharge line of the control room a throttle which results in the passive overheating of the discharge air and therefore a reduction of the moisture which is located in the discharge air (expansion drying). The desorption speed of the noble gases in the downstream adsorber column to be flushed is thereby promoted.

A throttle and/or an air dryer are advantageously located in the air supply line to the noble gas module in order to prevent excessively high moisture being conveyed to the noble gas columns.

The noble gas module can further be provided with a passive cold storage device in order to increase the k values. The k value describes in this context the adsorption capacity of the adsorber material for noble gas in, for example, the unit $cm^3$ of noble gas/g of adsorbent. The k value is dependent on the temperature, pressure and moisture content of the gas. It is generally established empirically.

The adsorber columns are preferably operated with the pressure changing method, that is to say, reduced pressure of the column to be flushed and excess pressure of the column to be charged (in relation to atmospheric pressure in each case) in order to improve the k values of the columns and to reduce the dimensions thereof. The excess pressure in the adsorber column through which the air supply flows is, for example, regulated with an adjustment valve in the air supply line.

The discharge air is discharged together with the backwashed noble gases into the power station environment with sufficient spacing from the air supply intake.

The ventilation system advantageously includes a control unit and corresponding adjustment members for through flow and pressures.

The advantages obtained with the invention particularly involve the radioactive noble gases being simultaneously retained from the supply air of the control room in addition to the air-borne activities in the form of aerosols and iodine/iodine compounds (in particular organo-iodine). Even long-life noble gas isotopes such as krypton 85 can be reliably separated from the air supply flow with the pressure change and flushing method of the twin columns. The conditions necessary for removing the noble gases from the sorbent/adsorbent are supported passively by expansion overheating. There is a requirement for electrical operating current substantially only for the fans in the air supply and the air discharge line and to a small extent for the associated control unit and for the switching device for switching between the operating cycles. That requirement can readily be met for at least 72 hours with an autonomous energy supply module (for example, by batteries and/or a diesel generator unit).

In summary, the following functions are provided in order to ensure the accessibility of the control room:
isolation of the control room air from the remaining parts of the building,
excess pressure with respect to the adjacent building rooms (for example, <1 mbar),
compliance with the admissible carbon monoxide and carbon dioxide concentration,
iodine retention,
aerosol retention,
retention of noble gases (for example, Kr, Xe),
limiting of the dose (for example, <100 mSv/7d),
temperature limiting in order to comply with the I&C temperature qualifications,
ensuring the above-mentioned functions for at least 72 hours.

Other advantages are summarized as key points:
modular and mobile system construction,
low complexity and high flexibility for integration in current systems,
low maintenance complexity,
a complex storage of breathable air is unnecessary,
it is possible to cover relatively large quantities of air (air exchange) and spatial regions.

Other features which are considered as characteristic for the invention are set forth in the appended claims.

Although the invention is illustrated and described herein as embodied in a ventilation system and an associated operating method for use during a serious incident in a nuclear power plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

The FIGURE of the drawing is a schematic and highly simplified overview of an embodiment of a ventilation system for a control room of a nuclear power station, which is explained in greater detail below.

DETAILED DESCRIPTION OF THE INVENTION

Referring now in detail to the single FIGURE of the drawing, there is seen an incident ventilation system which is referred to briefly as a ventilation system 2 that is used for supplying fresh air for a control room or operation center 4 (also referred to as a Main Control Room (MCR)) of a nuclear power station 6 in situations involving accidents or incidents, in particular during the start phase of a serious incident with a release of nuclear fission products within the power station building and where applicable also to the environment.

In such scenarios, which are generally associated with the failure of the individual power supply of the nuclear power station 6 and therefore also with the failure of the normally operational ventilation system (not illustrated) for the control room 4, it is particularly important to still be able to keep the control room 4 occupied for a specific time—for instance, up to 72 hours after the start of the incident—without endangering the operators in order to initiate initial counter-measures and to monitor them. Possibly, the operators may also have to remain in the control room 4 until secure evacuation is possible after an initial activity maximum has cooled.

For this purpose, the ventilation system 2 for the control room 4 is configured, on one hand, for a supply of decontaminated and oxygen-rich fresh air—also referred to as supply air—from the environment of the control room 4 or the power station building and provided with corresponding filter and cleaning stages. On the other hand, the ventilation system 2 brings about a discharge of consumed air rich in carbon dioxide—also referred to as discharge air—from the control room 4 into the environment. In this instance, unlike other, previously conventional concepts, neither a fresh air supply from an associated compressed air storage system nor a substantial recirculation and re-processing of the air in the inner space of the control room 4 is provided.

In specific terms, an air supply line 10, which is also referred to as a fresh air supply line or, in brief, as a fresh air line and through which fresh air from the environment is drawn in by using a fan 12 during the operation of the ventilation system 2 and is conveyed into an inner space 8 of the control room 4, is connected to the inner space 8 which is at least approximately hermetically encapsulated with respect to the outer environment. An intake inlet or, in brief, an inlet 14 of the air supply line 10 can be located at a spacing from the control room 4, in particular outside the power station building. Depending on the progress of the incident, the fresh air drawn in through the inlet 14 can nevertheless be substantially charged with radioactive fission products, in particular in the form of aerosols, iodine and iodine compounds and noble gases. Those components are intended to be removed as completely and reliably as possible from the fresh air flow—also referred to as an air supply flow—before the flow is introduced through a conduit 16 in an enclosure wall 18 (only illustrated as a cutout) into the inner space 8 of the control room 4.

To this end, downstream of the inlet 14 when viewed in the direction of the fresh air flow, a first filter stage in the form of an aerosol filter 20 is connected to the air supply line 10. In this instance, by way of example, the aerosol filter 20 is produced by two HEPA filters 22 which are connected in parallel in terms of flow (HEPA=High Efficiency Particulate Air filter). The HEPA filters 22 accordingly bring about a highly efficient separation of the aerosol particulates (also referred to as airborne particulates) from the fresh air flow, in particular in relation to the isotopes Te, Cs, Ba, Ru, Ce, La.

Further downstream, a second filter stage having an iodine filter 24 and a downstream particulate filter 26 is connected to the air supply line 10. The iodine filter 24 is preferably in the form of an activated carbon filter bed having a layer thickness of, for example, from 0.1 to 0.5 m. After the separation of the airborne particulates as carried out previously in the aerosol filter 20, radioactive iodine compounds and elemental iodine are separated in the iodine filter 24, for example, at a k value >8 for contact times of from 0.1 to 0.5 s. In order to separate the radioactive methyl iodide by using isotope exchange or salt formation, impregnated activated carbon (for example, with potassium iodide as the impregnation device) can be used. The particulate filter 26, which is connected downstream of the iodine filter 24, is provided for retaining dust particles from the activated carbon bed.

Downstream of the second filter stage, a conveyor fan or in brief the fan 12 is connected to transport the fresh air flow into the air supply line 10. The preferably electrically driven fan 12 has a suction power in the range, for example, of from 1000 to 6000 $m^3/h$.

In order to provide the necessary operating current, there is provided an autonomous power supply module 28 which is independent of the normally operational individual power supply and preferably also of the conventional emergency power network (across the plant), for example, on the basis of electrical batteries/accumulators and/or a diesel generator unit. The power supply module 28 becomes activated as required, preferably independently in the manner of a non-interrupted power supply, or is alternatively controlled through an associated control unit 30.

Further downstream there may optionally be connected to the air supply line 10 an air dryer 32 which is also referred to as a cold trap and with which condensable components can be separated from the fresh air flow. This may be, for example, a passive cold trap with silica gel and/or ice as a drying agent. The moisture content of the fresh air flow which flows into the downstream functional units (see below) is thereby reduced. An alternatively or additionally present throttle 34, which is disposed in this case in the embodiment when viewed in the direction of flow of the fresh air downstream of the air dryer 32 and which acts on the fresh air flow in accordance with the principle of expansion drying, serves the same purpose. The throttle may be, in particular, an adjustable throttle valve.

Following the filtering and drying, the fresh air flow flows, for a corresponding position of associated positioning members (see below), for example, through a line portion 36, to which a noble gas adsorber column or, in brief, an adsorber column 38 is connected. In this instance, the noble gases which are contained in the fresh air flow, in particular xenon and krypton, are bound, in the context of a dynamically adjusting equilibrium by physical and/or chemical adsorption, to the adsorbent present in the adsorber column 38, and consequently decelerated in the line portion 36 as long as the adsorption capacity of the adsorber column 38 is not yet exhausted. In particular one or more layers of activated carbon and/or zeolite and/or molecular sieves may be provided as the adsorbent.

A line portion which leads to the control room 4 and to which a particulate filter 40 is connected in order to retain loosened adsorber particulates, is connected downstream of the adsorber column 38.

Finally, the fresh air flow which is decontaminated in the manner described is introduced through the conduit 16 through the enclosure wall 18 of the control room 4 into the inner space 8 thereof so that non-consumed, oxygen-rich air for breathing with an activity degree which is permitted for the operators is supplied thereto.

The air exchange is brought about by the discharge of consumed, carbon-dioxide-rich air for breathing from the control room 4 through an air discharge line 44, which is connected to the inner space 8 thereof and which is directed through a conduit 42 in the enclosure wall 18 into the environment and to which a fan 46 is connected in order to support the gas transport. The fan is preferably an electrically driven fan 46 which is supplied with electric current similarly to the fan 12 by the power supply module 28.

Since the adsorption capacity of the adsorber column 38 which acts on the fresh air flow is generally already exhausted after a relatively short operating time for a practicable construction size, the ventilation system 2 is configured for a backwashing of the adsorbed noble gases into the environment during current operation. For this purpose, there are provided two substantially structurally identical adsorber columns 38 and 48 which are acted on through corresponding line branches and connections and positioning members, in this instance in the form of 3-way valves, with fresh air or discharge air in such a manner that one of the two adsorber columns 38 and 48, as already described, acts on the fresh air flow during adsorption operation, while the other is simultaneously backwashed during desorption operation or flushing operation by the discharge air flow and is consequently made ready for the next adsorption cycle. The function of the adsorber columns 38 and 48 can be transposed and consequently a change can be brought about in relation to the respective column cyclically between adsorption operation and desorption operation by switching over the positioning members.

In the embodiment illustrated in the FIGURE, this functionality is brought about in that one adsorber column 38 is disposed in the line portion 36 and the other adsorber column 48 is disposed in a line portion 50 with a non-parallel connection in flow terms. The two line portions 36 and 50 are combined at one side in a 3-way valve 52 and at the other side in a union 54 which is disposed at the intake side of the fan 46. Furthermore, at one side between the 3-way valve 52 and the two adsorber columns 38, 48, a transverse connection 60 which can be switched by two 3-way valves 56 and 58 is connected between the two line portions 36 and 50 and is connected through a T-connection 62 to the portion of the air supply line 10 leading to the particulate filter 40. At the other side, in a similar configuration, a transverse connection 68 which can be switched by two 3-way valves 64 and 66 is connected between the adsorber columns 38, 48 and the union 54 and is connected through a T-connection 70 to the portion of the air supply line 10 coming from the throttle 34.

In the case of correspondingly selected valve positions, as already described above, the supply air from the throttle 34 flows through the T-connection 70, the 3-way valve 66, the adsorber column 38 at the bottom in the FIGURE, the 3-way valve 58 and the T-connection 62 to the particulate filter 40 and, from there, further to the control room 4. In the other line strand, the discharge air from the control room 4 flows through the 3-way valve 52, the 3-way valve 56, the adsorber column 48 at the top in the FIGURE and the 3-way valve 64 to the suction connection of the fan 46 and, from there, further to a discharge chimney or to another outlet 72, which is advantageously located with spacing from the inlet 14 for fresh air.

That is to say, the noble gases which are accumulated in the previous cycle in the adsorber column 48 by adsorption are desorbed in this operating mode by the substantially noble-gas-free discharge air from the inner space 8 of the control room 4 by the adsorbent and backwashed with the discharge air flow into the environment. The backwashing is supported by the fan 46 which is disposed downstream of the backwashed adsorber column 48, wherein the volume increase of the discharge air flow as a result of the reduced pressure increases the backwashing process of the noble gases.

There is located, in the air discharge line 44 of the control room, when viewed in the direction of the discharge air flow, upstream of the 3-way valve 52 and consequently upstream of the adsorber column 48 presently being used for flushing operation, a throttle 74, preferably in the form of an adjustable throttle valve which results in the passive overheating of the discharge air and therefore a reduction of the moisture located in the discharge air (expansion drying). The desorption speed of the noble gases in the downstream adsorber column 48 is thereby promoted.

After the switch-over, the functions of the adsorber columns 38 and 48 are transposed. Now the fresh air flows from the throttle 34 through the 3-way valve 64, the adsorber column 48 and the 3-way valve 56 to the particulate filter 40 and, from there, to the control room 4. However, the discharge air from the control room 4 flows from the throttle 74 through the 3-way valve 52, the 3-way valve 58, the adsorber column 38 and the 3-way valve 66 to the fan 46 and, from there, to the outlet 72. The previously charged adsorber column 38 is now backwashed by the discharge air while the adsorber column 48 is available for cleaning the fresh air and accordingly for repeated charging.

In order to control the switch-over operations by using the 3-way valves 52, 56, 58, 64, 66, there is provided the control unit 30 which advantageously also controls the two fans 12 and 46 and optionally other positioning members for throughflow and pressures. It will be self-evident to the person skilled in the art that the switch-over functionality can also be brought about by using other line topologies and positioning members in an equivalent manner.

As indicated by the broken peripheral lines, the ventilation system 2 is preferably constructed in a modular manner from a noble gas module 76, an iodine and aerosol module 78 and a power supply module 28. The boundaries between the modules can naturally in detail also be selected to be different and there may be other modules or sub-modules. The individual modules are received, for example, in standard containers in a transportable manner so that simple transport to the installation location and simple construction at that location can be carried out by connecting the associated, standardized line connections.

Even if the description was previously directed towards the ventilation of the (central) control room of a nuclear power station, it is nevertheless clear that the ventilation system 2 can also be used for incident ventilation of other areas within a nuclear power station or more generally a nuclear plant—for instance, also combustion element storage areas, reprocessing plants, fuel processing plants, etc.— for example, of auxiliary plant buildings, switching plant rooms, measurement control rooms or other operating and monitoring rooms. The designation "operations room" is also used in a summarizing manner as a keyword for such rooms.

The invention claimed is:

1. A method for operating a ventilation system for an operator-accessible operations room in a nuclear plant or control room in a nuclear power station, the method comprising the following steps:

providing an external inlet, an air supply line guided from the external inlet to the operations room or control room, a first noble gas adsorber column connected to the air supply line, and a first fan connected in the air supply line upstream of the first noble gas adsorber column in a supply air flow direction;

providing an external outlet, an air discharge line guided from the operations room or control room to the external outlet, a second noble gas adsorber column connected to the air discharge line, and a second fan connected to the air discharge line downstream of the second noble gas adsorber column in a discharge air flow direction;

providing a switch-over device for exchanging functions of the first and second noble gas adsorber columns;

guiding supply air through one of the noble gas adsorber columns thereby charging the one noble gas adsorber column with radioactive noble gases while simultaneously guiding discharge air through the other of the noble gas adsorber columns and thereby backwashing the other noble gas adsorber column;

exchanging functions of the two noble gas adsorber columns by switching-over as soon as an adsorption capacity of a currently charged noble gas adsorber column is exhausted; and establishing reduced pressure, relative to atmospheric pressure, in the noble gas adsorber column to be backwashed and establishing excess pressure, relative to atmospheric pressure, in the noble gas adsorber column to be charged.

* * * * *